(12) United States Patent
Kubota

(10) Patent No.: US 7,289,581 B2
(45) Date of Patent: Oct. 30, 2007

(54) RECEIVING APPARATUS

(75) Inventor: Shinpei Kubota, Yao (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 699 days.

(21) Appl. No.: 10/750,807

(22) Filed: Jan. 5, 2004

(65) Prior Publication Data
US 2004/0190654 A1  Sep. 30, 2004

(30) Foreign Application Priority Data
Mar. 25, 2003 (JP) .............................. 2003-082914

(51) Int. Cl.
*H04L 27/08* (2006.01)
(52) U.S. Cl. ...................................... 375/345
(58) Field of Classification Search ................ 375/316, 375/345; 455/234.1, 232.1, 239.1, 240.1, 455/245.1, 247.1, 250.1; 330/129, 254
See application file for complete search history.

(56) References Cited

U.S. PATENT DOCUMENTS 6,735,260 B1 * 5/2004 Eliezer et al. .............. 375/316

FOREIGN PATENT DOCUMENTS

JP  2002-290178 A  10/2002

OTHER PUBLICATIONS

Mano et al, "Logic and Computer Design Fundamentals", 2nd edition, Published Jul. 2000. ISBN: 0130314862.*

* cited by examiner

*Primary Examiner*—David C. Payne
*Assistant Examiner*—Leon Flores
(74) *Attorney, Agent, or Firm*—Birch, Stewart, Kolasch & Birch, LLP

(57) ABSTRACT

A receiving apparatus may be provided with a variable gain amplifier amplifying a received signal, an output level of which is detected by a level detection circuit. A comparing circuit compares an output from a level detection circuit to a reference level. There is a binarizing circuit and a detection circuit for detecting a switching of a gain of a variable gain amplifier. A slice level holding circuit holds, at substantially constant value, a slice level employed at the binarizing circuit. A counter circuit and at least one of the slice levels may be held at substantially constant value for a prescribed time when switching of the gain of a variable gain amplifier is detected, rendering at least partially ineffective any noise produced during switching of the gain of the variable gain amplifier.

13 Claims, 10 Drawing Sheets

RECEIVING APPARATUS

CROSS-REFERENCE TO RELATED APPLICATION

This Nonprovisional application claims priority under under 35 U.S.C. § 119(a) on Patent Application No. 2003-082914 filed in Japan on Mar. 25, 2003, the entire contents of which are hereby incorporated by reference.

BACKGROUND OF INVENTION

1. Field of Invention

The present invention pertains to a receiving apparatus which may be used in Bluetooth and/or other such wireless communication equipment carrying out transmitting and/or receiving.

2. Conventional Art

Conventional proposals for receiving apparatuses capable of receiving wireless signals modulated by means of FSK (frequency shift keying) or the like include apparatuses having the circuit structure shown in FIG. 6, as disclosed for example at Japanese Patent Application Publication Kokai No. 2002-290178 (2002).

At the receiving apparatus shown in FIG. 6, a received RF (radio frequency) signal input from antenna 301 is amplified by LNA (low noise amplifier) 302 and is thereafter, at mixer 303, mixed with a local signal output from VCO (voltage-controlled oscillator) 304 and is converted into an IF (intermediate frequency) signal. The IF signal produced as a result of conversion is input at variable gain amplifier 305. At such time, variable gain amplifier 305 is set to its maximum gain.

The output signal from variable gain amplifier 305 branches into two output signal lines, one of which is input at level detection circuit 306. Level detection circuit 306 outputs a DC (direct current) voltage corresponding to the level of the signal output from variable gain amplifier 305. The signal output from level detection circuit 306 is input at comparing circuit 307.

Comparing circuit 307 compares the DC voltage output by level detection circuit 306 with a reference DC voltage, outputting an output signal when the DC voltage output by level detection circuit 306 is higher than the reference voltage (which signal is inverted relative to the output signal produced by comparing circuit 307 when the DC voltage output by level detection circuit 306 is lower than the reference voltage), for decreasing the gain of variable gain amplifier 305. As a result, an IF signal can be obtained without saturation of the output level of variable gain amplifier 305, even under conditions of forced input of the signal received from antenna 301.

The other of the two output signal lines from variable gain amplifier 305 is acted upon by limiter amplifier 308 and the signal output therefrom is made to possess constant output amplitude. The output from limiter amplifier 308 branches into two lines, one of which is input at demodulating mixer 310. The other output line from limiter amplifier 308 is input at phase circuit 309 and is shifted in phase by 90°.

As a result of multiplication, at demodulating mixer 310, of the output from this phase circuit 309 and the output from this limiter amplifier 308, a demodulated analog signal is output from demodulating mixer 310. While the demodulated analog signal contains high-frequency signal and carrier components produced as a result of multiplication, such high-frequency signal and carrier components are removed by means of LPF (low pass filter) 311. The demodulated analog output from LPF 311 is input at binarizing circuit 312.

Binarizing circuit 312 comprises slice level detection circuit 313 and comparing circuit 314. Slice level detection circuit 313 generates an optimum slice level in correspondence to the signal input thereto. Comparing circuit 314 compares the output from slice level detection circuit 313 and the output from LPF 311, performing binarization and outputting a binary signal.

Next, specific examples of binarizing circuits which may be employed in receiving apparatuses are shown in FIGS. 7 and 8.

FIG. 7 is an example of a binarizing circuit making use of demodulated signal minimum and maximum hold values.

At binarizing circuit 401 shown in FIG. 7, the demodulated signal is respectively input at minimum value detection circuit 404 and at maximum value detection circuit 403 of slice level detection circuit 402, the peak minimum value thereof being stored at minimum value detection circuit 404 and the peak maximum value thereof being stored at maximum value detection circuit 403. This peak minimum value and this peak maximum value are added together at adding circuit 405, the value produced as a result of this operation being halved at amplifier 406.

As a result of the foregoing operations, slice level detection circuit 402 outputs [(peak minimum value+peak maximum value)/2], this output being input at comparing circuit 407. Comparing circuit 407 carries out binarization by comparing the magnitude of the demodulated signal and the magnitude of the output from slice level detection circuit 402.

At binarizing circuit 501 shown in FIG. 8, the demodulated signal is input at adding circuit 502. The output from adding circuit 502 branches into two lines, the signal from one of which is input at offset canceler circuit 503. Offset canceler circuit 503 outputs a signal in accordance with the input/output characteristics of Formula (1).

$$\text{output} = \begin{cases} -\text{input} + A & (\text{input} > A) \\ 0 & (-A \leq \text{input} \leq A) \\ -\text{input} - A & (\text{input} < -A) \end{cases} \quad (A: \text{cutoff value (constant)}) \tag{1}$$

The output from offset canceler circuit 503 is input at integrating circuit 504. The output from integrating circuit 504 is input at adding circuit 502 and is added to the original demodulated signal.

As a result of the foregoing operations, the output from adding circuit 502 is converted into a signal which is centered on the value "0". The other signal line from adding circuit 502 is input at sign determining circuit 505, the sign of the signal input thereto being used to carry out binarization.

A receiving apparatus having the circuit structure shown in FIG. 6 permits attainment of wide input dynamic range. Furthermore, with such a receiving apparatus, it is possible by employing a binarizing circuit of structure as shown in FIG. 7 and/or 8 to accurately carry out binarization while still being able to accommodate sudden changes in DC level.

However, with a receiving apparatus of circuit structure such as is shown in FIG. 6, because the gain of the variable gain amplifier is switched discontinuously, noise is produced in the output of the variable gain amplifier during switching of the gain thereof. This noise will also affect the limiter amplifier which is downstream therefrom, as well as components downstream from the limiter amplifier. That is, presence of noise in the output from the variable gain amplifier will cause the slice level detection circuit to output a slice level which is different from the slice level that it would otherwise output, causing deterioration in the BER (bit error rate).

For example, taking the case of a receiving apparatus provided with the binarizing circuit of FIG. 7, as indicated in the output waveform diagram of FIG. 9, presence of noise due to switching of gain will cause the output (slice level) from amplifier 406 of binarizing circuit 401 to, under the influence of such noise, differ from what it would otherwise be, producing errors.

Or taking the case of a receiving apparatus provided with the binarizing circuit of FIG. 8, as indicated in the output waveform diagram of FIG. 10, presence of noise due to switching of gain will cause the output (adding circuit 502 output) from offset canceler circuit 503 of binarizing circuit 501 to, under the influence of such noise, differ from what it would otherwise be, producing errors.

SUMMARY OF INVENTION

The present invention was conceived in order to solve such problems, it being an object thereof to provide a receiving apparatus capable of eliminating or reducing the effect of noise produced during switching of variable gain amplifier gain so as to prevent deterioration in BER.

In order to achieve the foregoing and/or other objects, a receiving apparatus in accordance with one or more embodiments of the present invention comprises one or more variable gain amplifiers amplifying one or more IF signals derived from one or more received signals; one or more level detection circuits, at least one which detects one or more levels output from at least one of the variable gain amplifier or amplifiers; one or more comparing circuits comparing to one or more reference levels one or more outputs from at least one of the level detection circuit or circuits; one or more demodulators; one or more binarizing circuits; one or more gain switching detection circuits detecting switching of one or more gains of at least one of the variable gain amplifier or amplifiers; one or more slice level holding circuits holding at one or more substantially constant values one or more slice levels employed by at least one of the binarizing circuit or circuits; and one or more counter circuits; wherein at least one gain of at least one of the variable gain amplifier or amplifiers is switched based on at least one result of comparison by at least one of the comparing circuit or circuits; and wherein, when switching of at least one of the gain or gains is detected by at least one of the gain switching detection circuit or circuits, at least one of the counter circuit or circuits and at least one of the slice level holding circuit or circuits cause at least one of the slice level or levels to be held at at least one of the substantially constant value or values for one or more prescribed times.

Receiving apparatuses in accordance with embodiment(s) of the present invention, because they may permit slice level(s) to be held at substantially constant value(s) during period(s) when noise from variable gain amplifier(s) produced during switching of gain(s) of variable gain amplifier(s) might otherwise exert adverse effect(s) on binarizing circuit(s), make it possible to at least partially render ineffective any noise occurring during switching of gain(s). As a result, deterioration in BER may be prevented.

In receiving apparatus(es) in accordance with embodiment(s) of the present invention, variable gain amplifier(s) may also serve as BPF(s) (bandpass filter(s)). Thus, where variable gain amplifier(s) is or are provided with functionality permitting passage of only intermediate-frequency signal component(s), because it will be possible to eliminate BPF(s) and/or the like which might otherwise need to be provided upstream from variable gain amplifier(s), it will be possible to reduce the scale of circuitry and achieve miniaturization.

In receiving apparatus(es) in accordance with embodiment(s) of the present invention, comparing circuit(s) may also serve as gain switching detection circuit(s). Thus, where comparing circuit(s), conventionally present in receiving apparatus(es), is or are also made to serve as gain switching detection circuit(s), this will make it possible to reduce the scale of circuitry and achieve miniaturization.

In receiving apparatus(es) in accordance with embodiment(s) of the present invention, time(s) counted by counter circuit(s) may be variable. In accordance with such embodiments of the present invention, by making it possible to externally manipulate time(s) at which slice level(s) is or are held at substantially constant value(s), ability to change time(s) counted by counter circuit(s) will, even where there is variation in the timing with which switching of gain(s) of variable gain amplifier(s) is followed by occurrence of noise, make it possible to adjust time(s) at which slice level(s) is or are held at substantially constant value(s) in correspondence to such variation. Moreover, such adjustment/manipulation may be implemented after manufacture of product.

A receiving apparatus in accordance with one or more embodiments of the present invention may be such that binarizing circuit(s) comprise one or more minimum value detection circuits and one or more maximum value detection circuits accepting input of one or more demodulated signals from at least one of the demodulator or demodulators by way of one or more demodulated signal holding circuits and respectively detecting one or more minimum values and one or more maximum values of at least one of the demodulated signal or signals input thereto; one or more adding circuits adding at least one of the minimum value or values and at least one of the maximum value or values; one or more amplifiers substantially halving at least one output of at least one of the adding circuit or circuits; and one or more comparing circuits carrying out binarization by comparing at least one magnitude of at least one output from at least one of the amplifier or amplifiers and at least one magnitude of at least one of the demodulated signal or signals from at least one of the demodulator or demodulators; at least one of the demodulated signal holding circuit or circuits functioning as at least one of the slice level holding circuit or circuits.

In accordance with such embodiments of the present invention, in a receiving apparatus configured such that binarizing circuit(s) may utilize minimum value(s) and maximum value(s) in detecting slice level(s), signal(s) input at minimum value detection circuit(s) and maximum value detection circuit(s) may be held at substantially constant value(s) while noise is present, making it possible to achieve prevention of deterioration in BER due to noise.

A receiving apparatus in accordance with one or more embodiments of the present invention may be such that binarizing circuit(s) comprise one or more offset canceler circuits outputting, when one or more signals input thereto is or are less than one or more lower cutoff values, at least one signal corresponding to at least one amount by which at least one of the signal or signals input thereto is less than at least one of the lower cutoff value or values, and/or outputting, when one or more signals input thereto is or are greater than one or more upper cutoff values, at least one signal corresponding to at least one amount by which at least one of the signal or signals input thereto is greater than at least one of the upper cutoff value or values; one or more integrating circuits integrating at least one of the output or outputs therefrom; one or more offset canceler output holding circuits provided between at least one of the offset canceler circuit or circuits and at least one of the integrating circuit or circuits; one or more adding circuits adding and feeding back one or more outputs from at least one of the integrating circuit or circuits to one or more input signals; and one or more sign determining circuits using the sign of at least one signal output from at least one of the adding circuit or circuits to carry out binarization; at least one of the offset canceler output holding circuit or circuits functioning as at least one of the slice level holding circuit or circuits.

Such embodiments of the present invention, in the context of a receiving apparatus provided with binarizing circuit(s) of structure as shown in FIG. 8, achieve prevention of deterioration in BER due to noise by virtue of the fact that output(s) of offset canceler(s) may be held at substantially constant value(s) while noise is present, such embodiments of the present invention permitting prevention of deterioration in BER attributable to noise resulting from switching of gain(s) while being provided with binarizing circuit(s) capable of accurately carrying out binarization notwithstanding any sudden change(s) in DC offset(s) which may occur.

Thus, because receiving apparatuses in accordance with embodiments of the present invention may—by holding slice level(s) employed at binarizing circuit(s) at substantially constant value(s) for prescribed time(s) from point(s) in time when timing(s) indicating altered gain(s) of variable gain amplifier(s) is or are detected, i.e., during period(s) when noise produced by variable gain amplifier(s) might otherwise exert adverse effect(s) on binarizing circuit(s)—prevent abnormal operation of binarizing circuit(s), it is possible to prevent deterioration in BER attributable to noise produced during switching of gain(s) while permitting attainment of wide input dynamic range.

DESCRIPTION OF THE INVENTION

Below, embodiments of the present invention are described with reference to the drawings.

EMBODIMENT 1

Figure 1:
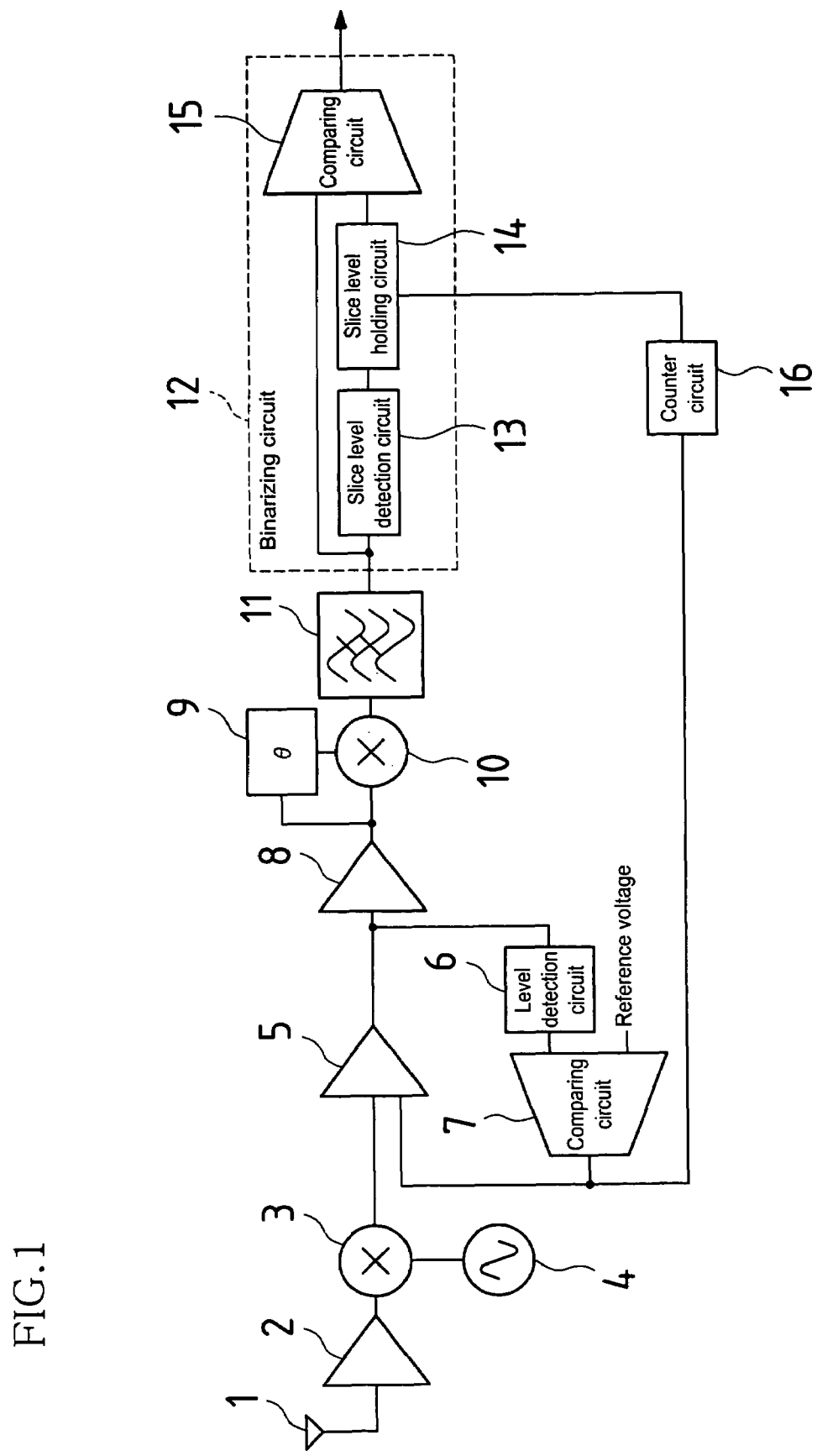
FIG. 1 is a block diagram showing the structure of an embodiment of the receiving apparatus of the present invention.

FIG. 1 is a block diagram showing the structure of a receiving apparatus in accordance with an embodiment of the present invention.

Figure 6:
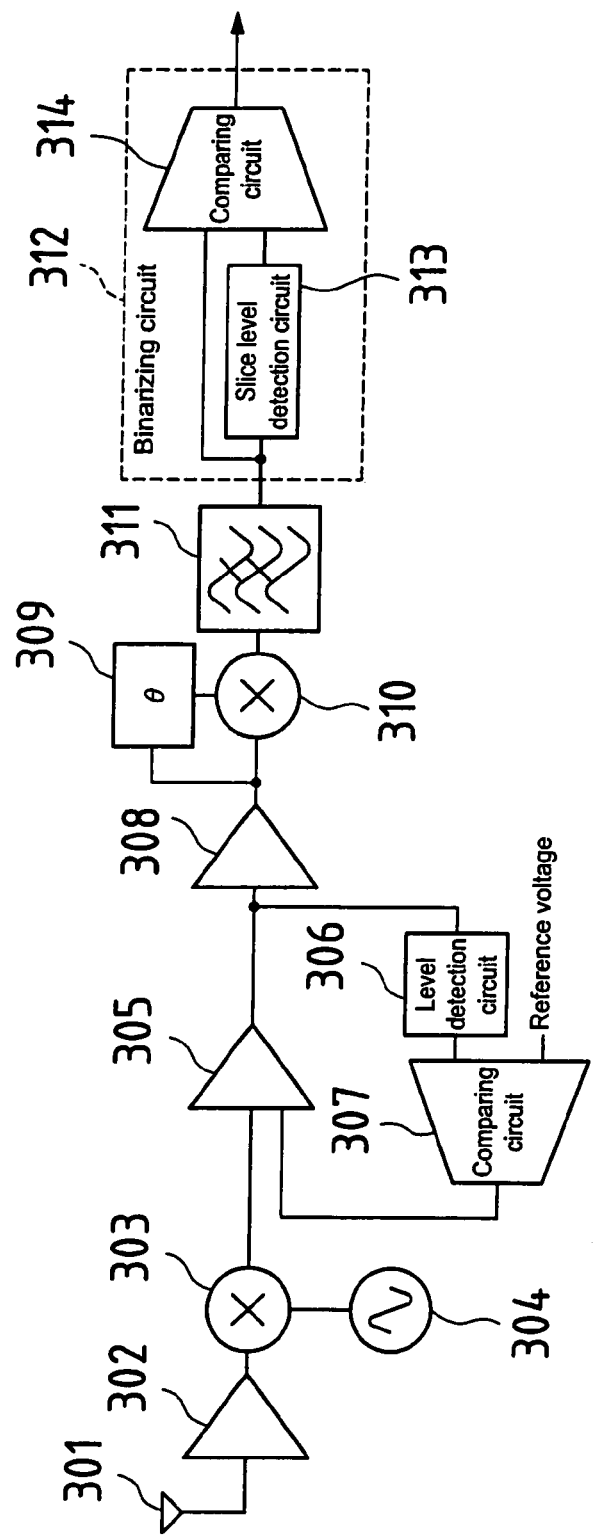
FIG. 6 is a block diagram showing the structure of a conventional receiving apparatus.

As at the receiving apparatus shown in FIG. 6, the receiving apparatus shown in FIG. 1 is provided with antenna 1, LNA 2, mixer 3, VCO 4, variable gain amplifier 5, level detection circuit 6, comparing circuit 7, limiter amplifier 8, phase circuit 9, demodulating mixer 10, LPF 11, and also with binarizing circuit 12 having slice level detection circuit 13 and comparing circuit 15; but characteristic of the receiving apparatus shown in FIG. 1 is the fact that, in addition to structure corresponding to the elements at the receiving apparatus shown in FIG. 6, counter circuit 16 and slice level holding circuit 14 (installed at binarizing circuit 12) are also provided. Slice level holding circuit 14 is disposed between comparing circuit 15 and slice level detection circuit 13 of binarizing circuit 12.

Next, operation of this embodiment is described below.

A received RF signal input from antenna 1 is amplified by LNA 2 and is thereafter, at mixer 3, mixed with a local signal output from VCO 4 and is converted into an IF signal. The IF signal produced as a result of conversion is input at variable gain amplifier 5, which is set to its maximum gain.

The output from variable gain amplifier 5 branches into two output lines, one of which is input at level detection circuit 6. Level detection circuit 6 outputs a DC voltage corresponding to the level of the signal output from variable gain amplifier 5. The signal output from level detection circuit 6 is input at comparing circuit 7.

Comparing circuit 7 compares the DC voltage output by level detection circuit 6 and a reference DC voltage, outputting an output signal when the DC voltage output by level detection circuit 6 is higher than the reference voltage (which signal is inverted relative to the output signal produced by comparing circuit 307 when the DC voltage output by level detection circuit 6 is lower than the reference voltage), for decreasing the gain of variable gain amplifier 5. Simultaneous therewith, output from comparing circuit 7 is input at counter circuit 16.

Under ordinary circumstances, counter circuit 16 inverts the sign of the output therefrom for a prescribed time defined relative to the point in time when the sign of the output from comparing circuit 7 goes inverted. For the purposes of the present example, the sense of the output from counter circuit 16 will be taken to ordinarily be LOW, the output therefrom being HIGH for a prescribed time starting from the point in time when the sign of the output of comparing circuit 7 goes inverted. The output from counter circuit 16 is input at slice level holding circuit 14. Note also that the time (prescribed time) counted by counter circuit 16 will be taken to be a time corresponding to the time during which noise produced by variable gain amplifier 5 would otherwise exert adverse effect on binarizing circuit 12.

The other of the two output signal lines from variable gain amplifier 5 is acted upon by limiter amplifier 8 and the signal output therefrom is made to possess constant output amplitude. The output from limiter amplifier 8 branches into two lines, one of which is input at demodulating mixer 10. The other output line from limiter amplifier 8 is input at phase circuit 9 and is shifted in phase by 90°.

The output from phase circuit 9 and the output from limiter amplifier 8 are multiplied together by demodulating mixer 10, as a result of which a demodulated analog signal is output from demodulating mixer 10. As the demodulated analog signal contains high-frequency signal and carrier components produced as a result of multiplication, such high-frequency signal and carrier components are removed by means of LPF 11. The demodulated analog output from this LPF 11 is input at binarizing circuit 12.

Slice level detection circuit 13 of binarizing circuit 12 generates an optimum slice level in correspondence to the signal input thereto. The output from slice level detection circuit 13 is input at slice level holding circuit 14.

When the output of counter circuit 16 is LOW, slice level holding circuit 14 outputs in substantially unaltered fashion the same signal which is input thereto; but when the output of counter circuit 16 is HIGH, slice level holding circuit 14 causes the output therefrom to be held at substantially constant value (i.e., the slice level is held at substantially constant value). Comparing circuit 15 compares the output from slice level detection circuit 14 (the output from slice level detection circuit 13) and the output from LPF 11, performing binarization and outputting a binary signal.

In accordance with the present embodiment, because, as described above, the output from counter circuit 16 is made HIGH, causing the slice level to be held at substantially constant value, for a prescribed time (the period when noise produced by variable gain amplifier 5 might otherwise exert adverse effect on binarizing circuit 12) from point(s) in time when the output of comparing circuit 7 is inverted, i.e., from point(s) in time when the gain of variable gain amplifier 5 is switched, it is possible to at least partially render ineffective any noise occurring during switching of gain and it is possible to prevent abnormal operation of binarizing circuit 12. As a result, deterioration in BER can be prevented.

EMBODIMENT 2

Figure 2:
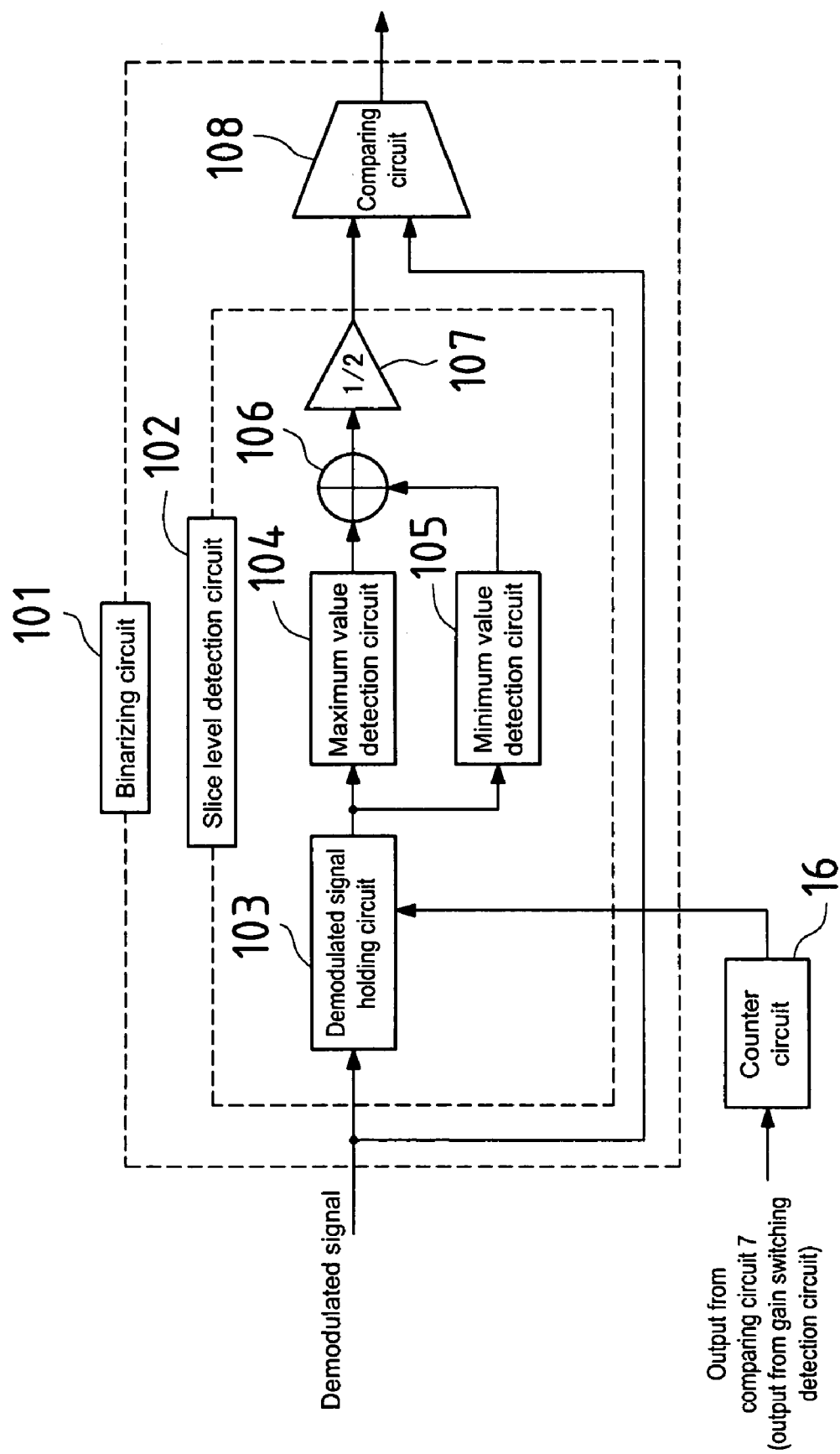
FIG. 2 is a block diagram showing the structure of a binarizing circuit employed in another embodiment of the receiving apparatus of the present invention.

FIG. 2 is a block diagram showing the structure of a binarizing circuit in another embodiment of the receiving apparatus of the present invention. Note that since, except for the binarizing circuit, the constitution of the receiving apparatus of the present embodiment is in other respects identical to that of the constitution of the respective components in the foregoing first embodiment, detailed description thereof will be omitted.

Figure 7:
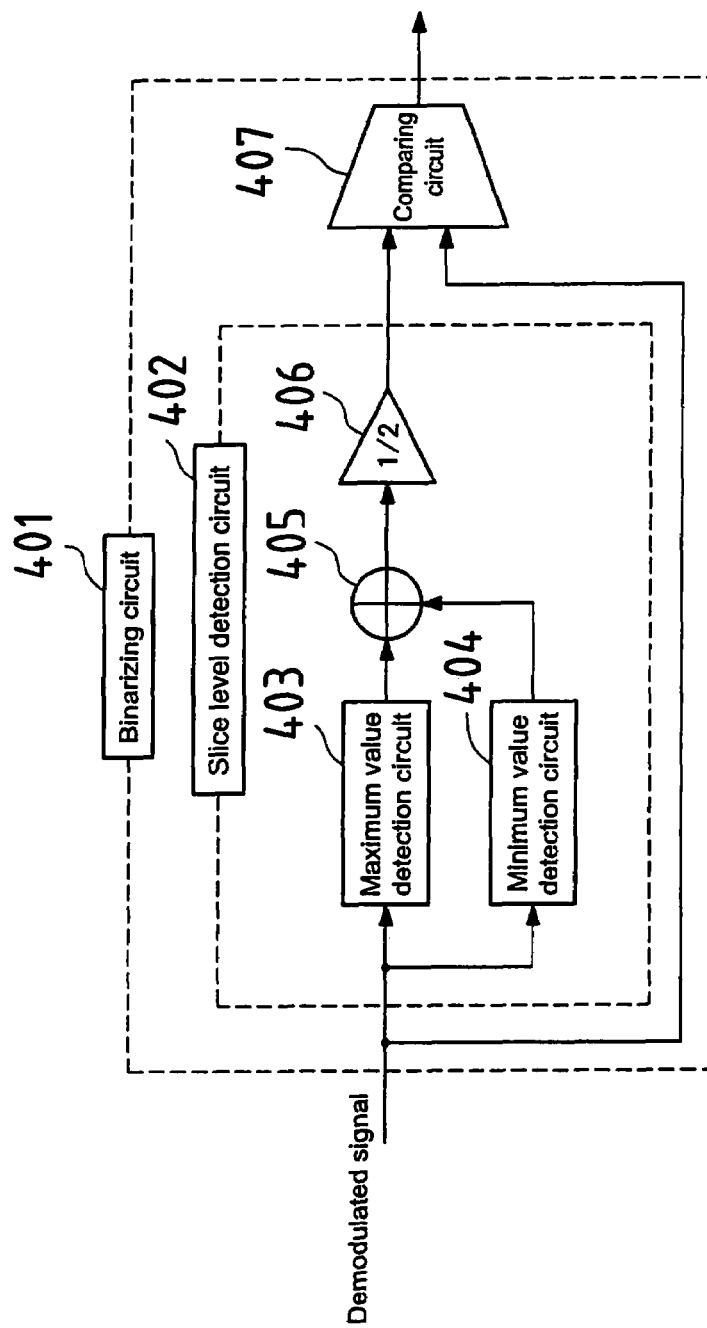
FIG. 7 is a block diagram showing an example of a binarizing circuit employed in a conventional receiving apparatus.

Binarizing circuit 101 of FIG. 2, like the binarizing circuit shown in FIG. 7, is equipped with slice level detection circuit 102 and comparing circuit 108. Slice level detection circuit 102 is provided with minimum value detection circuit 105, maximum value detection circuit 104, adding circuit 106, and amplifier 107; and in addition to such structure, is moreover provided with demodulated signal holding circuit 103 at the input stage thereof.

Next, operation of this embodiment will be described.

A demodulated signal is generated as a result of operations similar to those at the foregoing first embodiment, this demodulated signal being input at demodulated signal holding circuit 103 of slice level detection circuit 102. Demodulated signal holding circuit 103, like slice level holding circuit 14 in the foregoing first embodiment, outputs in substantially unaltered fashion the same signal which is input thereto when the output of counter circuit 16 is LOW, but causes the output therefrom to be held at substantially constant value when the output of counter circuit 16 is HIGH.

The output (demodulated signal) from demodulated signal holding circuit 103 is respectively input at minimum value detection circuit 105 and at maximum value detection circuit 104, the peak minimum value thereof being stored at minimum value detection circuit 105 and the peak maximum value thereof being stored at maximum value detection circuit 104. This peak minimum value and this peak maximum value are added together at adding circuit 106, the value produced as a result of this operation being halved at amplifier 107.

As a result of the foregoing operations, slice level detection circuit 102 outputs [(peak minimum value of output from demodulated signal holding circuit 103+peak maximum value of output from same circuit)/2], the output signal therefrom being input at comparing circuit 108. Comparing circuit 108 carries out binarization by comparing the magnitude of the demodulated signal and the magnitude of the output from slice level detection circuit 102.

Figure 3:
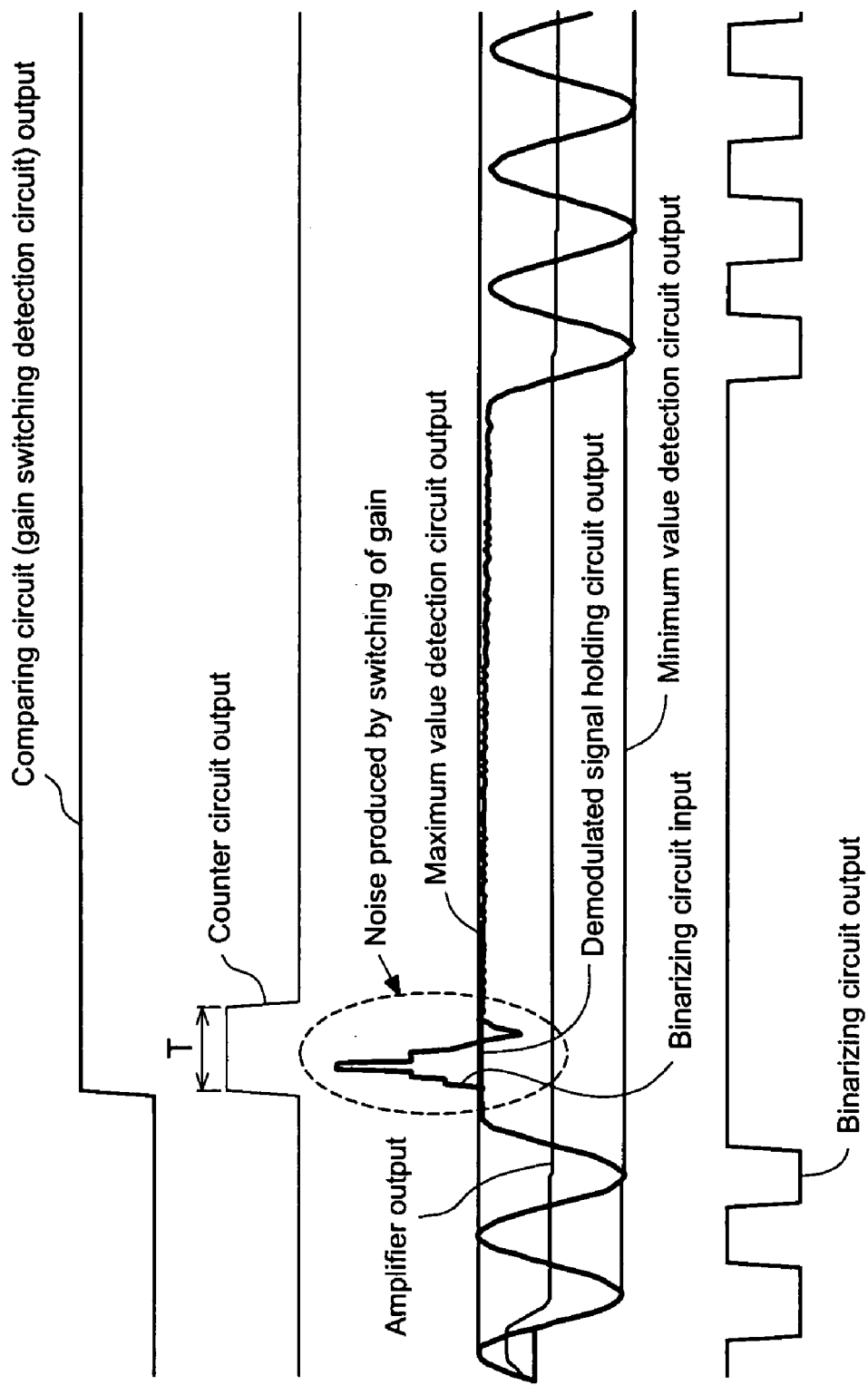
FIG. 3 is a drawing showing waveforms output by respective blocks in the block diagram of the binarizing circuit shown in FIG. 2.

Moreover, in the present embodiment, due to the fact that, as indicated in the output waveform diagram of FIG. 3, the output from counter circuit 16 is made HIGH, causing the signal which is input at minimum value detection circuit 105 and maximum value detection circuit 104 to be held at substantially constant value, for prescribed time T (the period when noise produced by variable gain amplifier 5 might otherwise exert adverse effect on binarizing circuit 101) from point(s) in time when the output of comparing circuit 7 is inverted, i.e., from point(s) in time when the gain of variable gain amplifier 5 is switched, abnormal operation of binarizing circuit 101 is prevented and deterioration in BER is prevented.

EMBODIMENT 3

Figure 4:
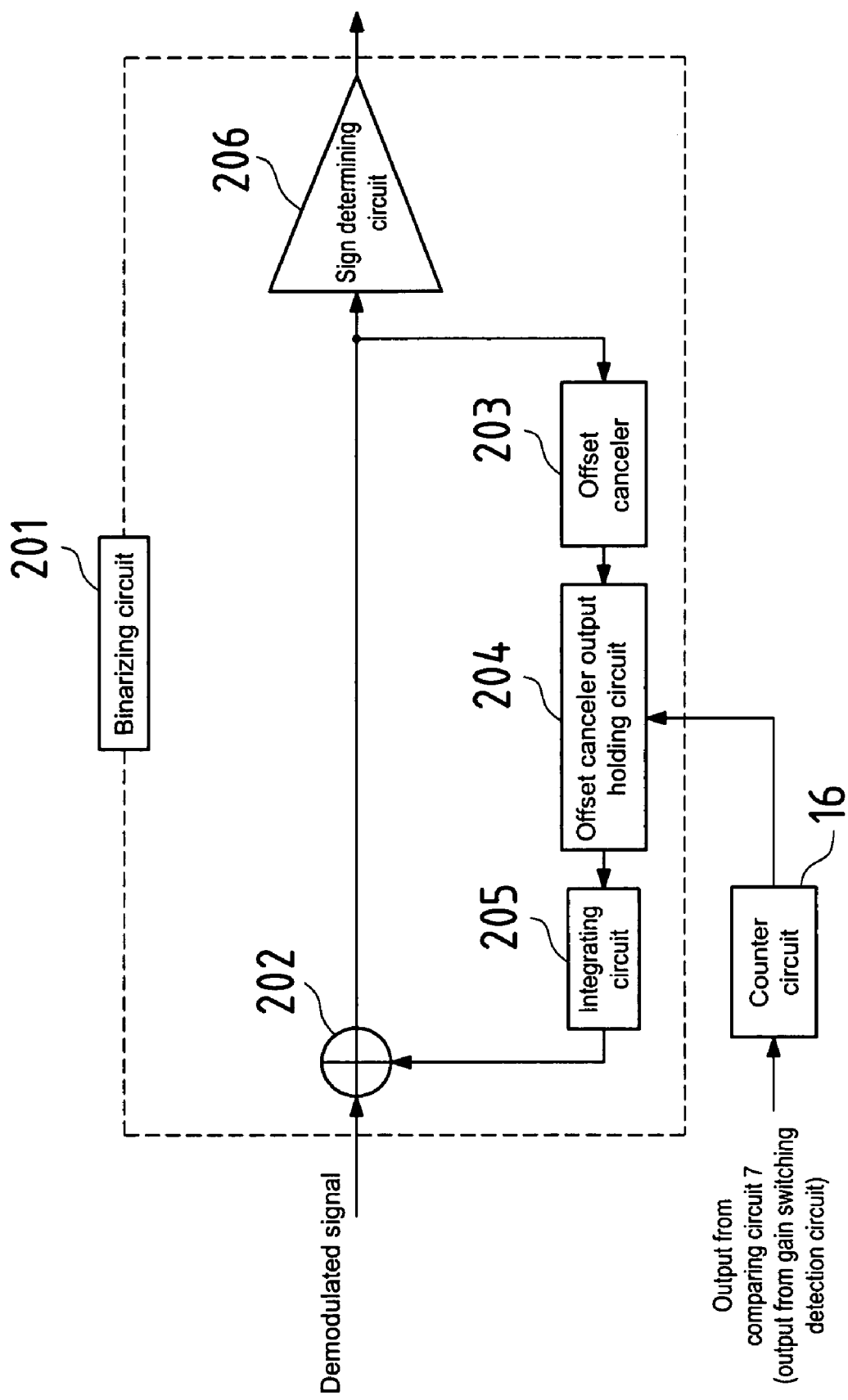
FIG. 4 is a block diagram showing the structure of a binarizing circuit employed in a different embodiment of the receiving apparatus of the present invention.

FIG. 4 is a block diagram showing the structure of a binarizing circuit in a different embodiment of the receiving apparatus of the present invention. Note that since, except for the binarizing circuit, the constitution of the receiving apparatus of the present embodiment is in other respects identical to that of the constitution of the respective components in the foregoing first embodiment, detailed description thereof will be omitted.

Figure 8:
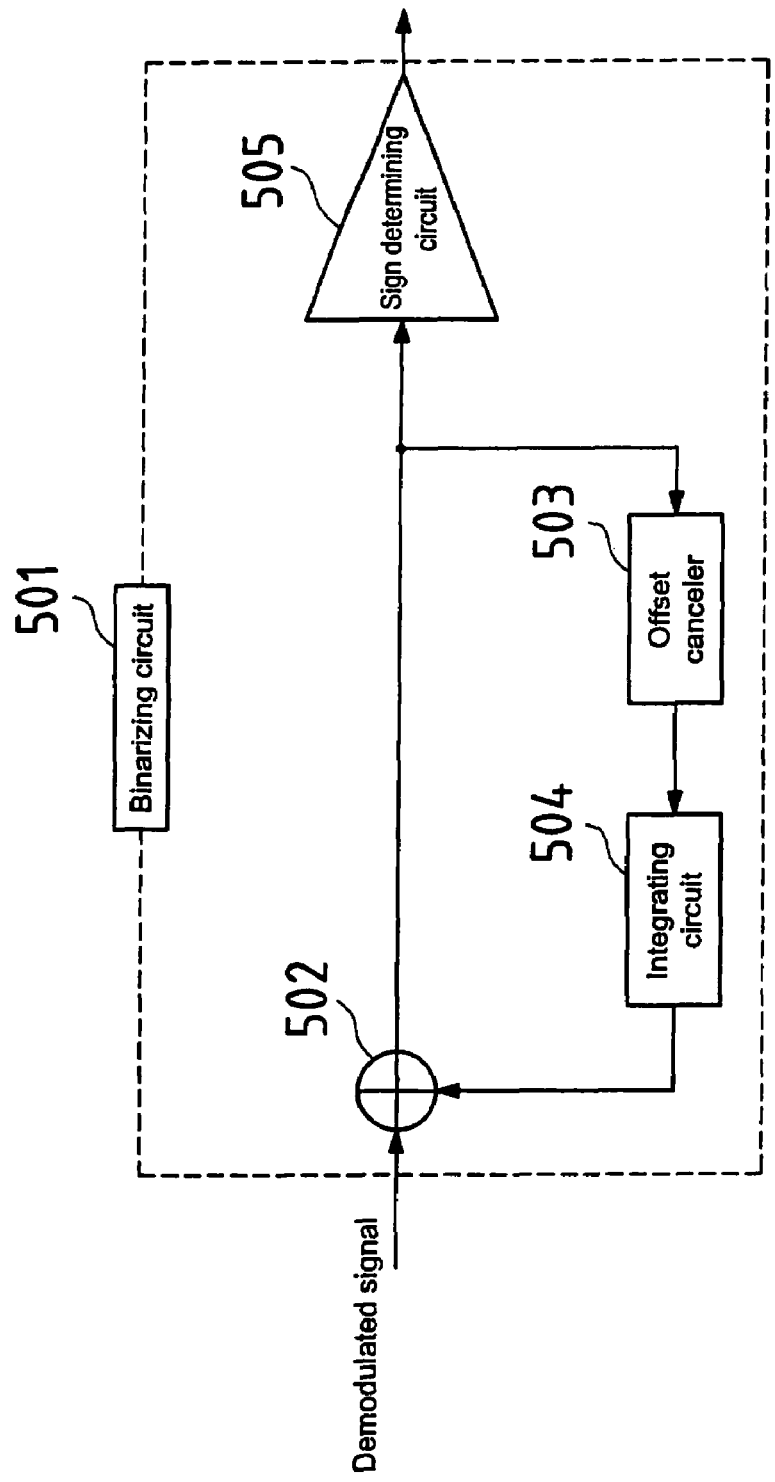
FIG. 8 is a block diagram showing another example of a binarizing circuit employed in a conventional receiving apparatus.
Figure 9:
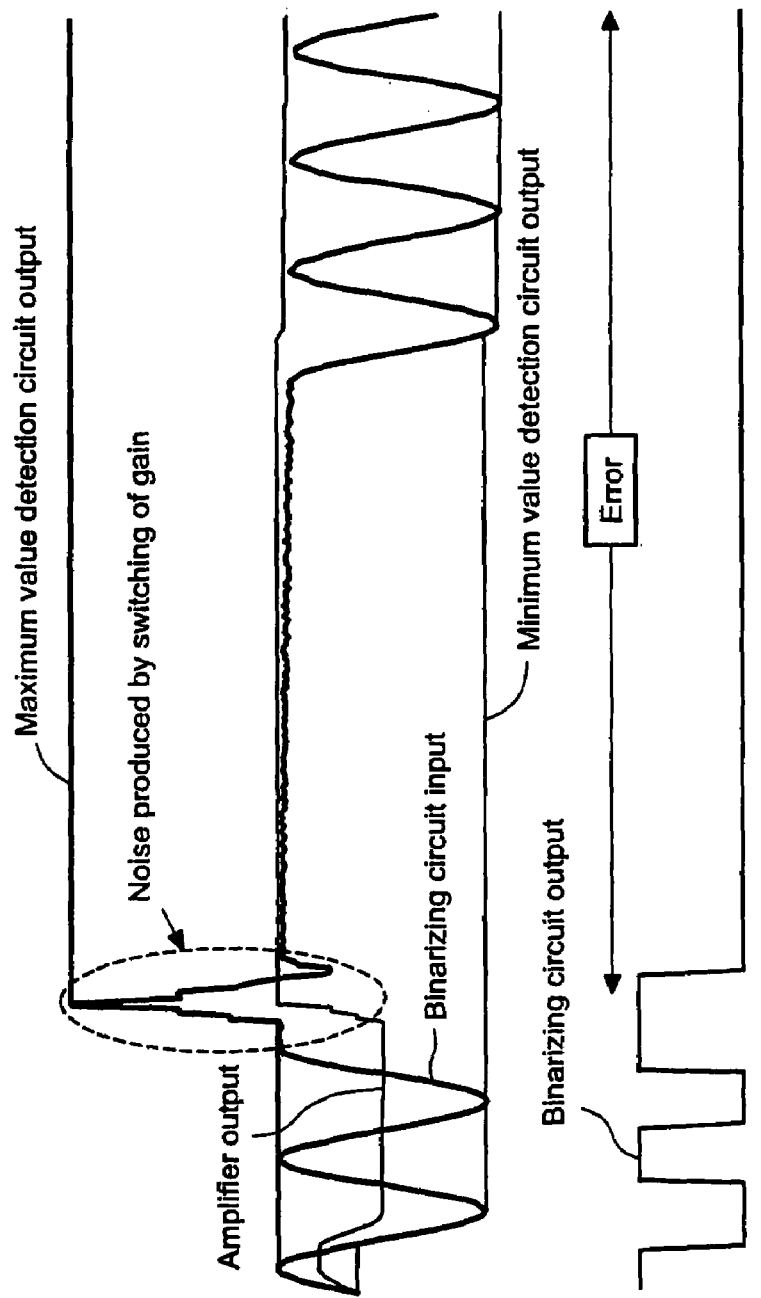
FIG. 9 is a drawing showing waveforms output by respective blocks in the block diagram of the binarizing circuit shown in FIG. 7.
Figure 10:
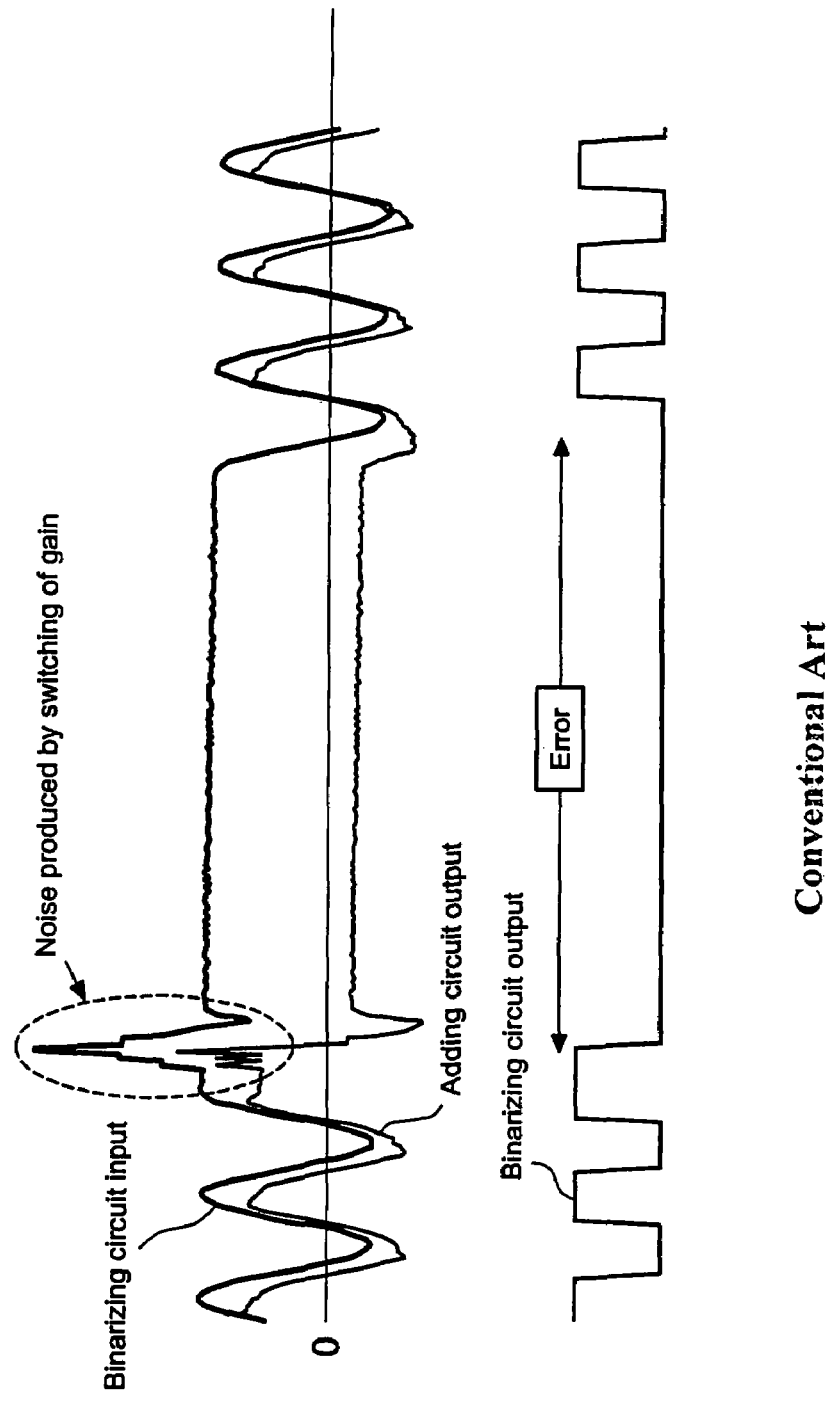
FIG. 10 is a drawing showing waveforms output by respective blocks in the block diagram of the binarizing circuit shown in FIG. 8.

Binarizing circuit 201 of FIG. 4, like the binarizing circuit shown in FIG. 8, is equipped with adding circuit 202, offset canceler circuit 203, integrating circuit 205, and sign determining circuit 206; and in addition to such structure, is moreover provided with offset canceler output holding circuit 204. Offset canceler output holding circuit 204 is disposed between offset canceler circuit 203 and integrating circuit 205.

Next, operation of this embodiment will be described.

A demodulated signal is generated as a result of operations similar to those at the foregoing first embodiment, this demodulated signal being input at adding circuit 202 of binarizing circuit 201. The output from adding circuit 202 branches into two lines, the signal from one of which is input at offset canceler circuit 203. Offset canceler circuit 203 outputs a signal in accordance with the input/output characteristics of Formula (2).

$$\text{output} = \begin{cases} -\text{input} + A & (\text{input} > A) \\ 0 & (-A \leq \text{input} \leq A) \\ -\text{input} - A & (\text{input} < -A) \end{cases} \quad (A: \text{cutoff value (constant)}) \quad (2)$$

The output from offset canceler circuit 203 is input at offset canceler output holding circuit 204. Offset canceler output holding circuit 204, like slice level holding circuit 14 in the foregoing first embodiment, outputs in substantially unaltered fashion the same signal which is input thereto when the output of counter circuit 16 is LOW, but causes the output therefrom to be held at substantially constant value when the output of counter circuit 16 is HIGH. The output from offset canceler output holding circuit 204 (the output from offset canceler circuit 203) is input at integrating circuit 205. The output from integrating circuit 205 is input at adding circuit 202 and is added to the original demodulated signal.

As a result of the foregoing operations, the output from adding circuit 202 is converted into a signal which is centered on the value "0". The other signal line from adding circuit 202 is input at sign determining circuit 206, the sign of the signal input thereto being used to carry out binarization.

Figure 5:
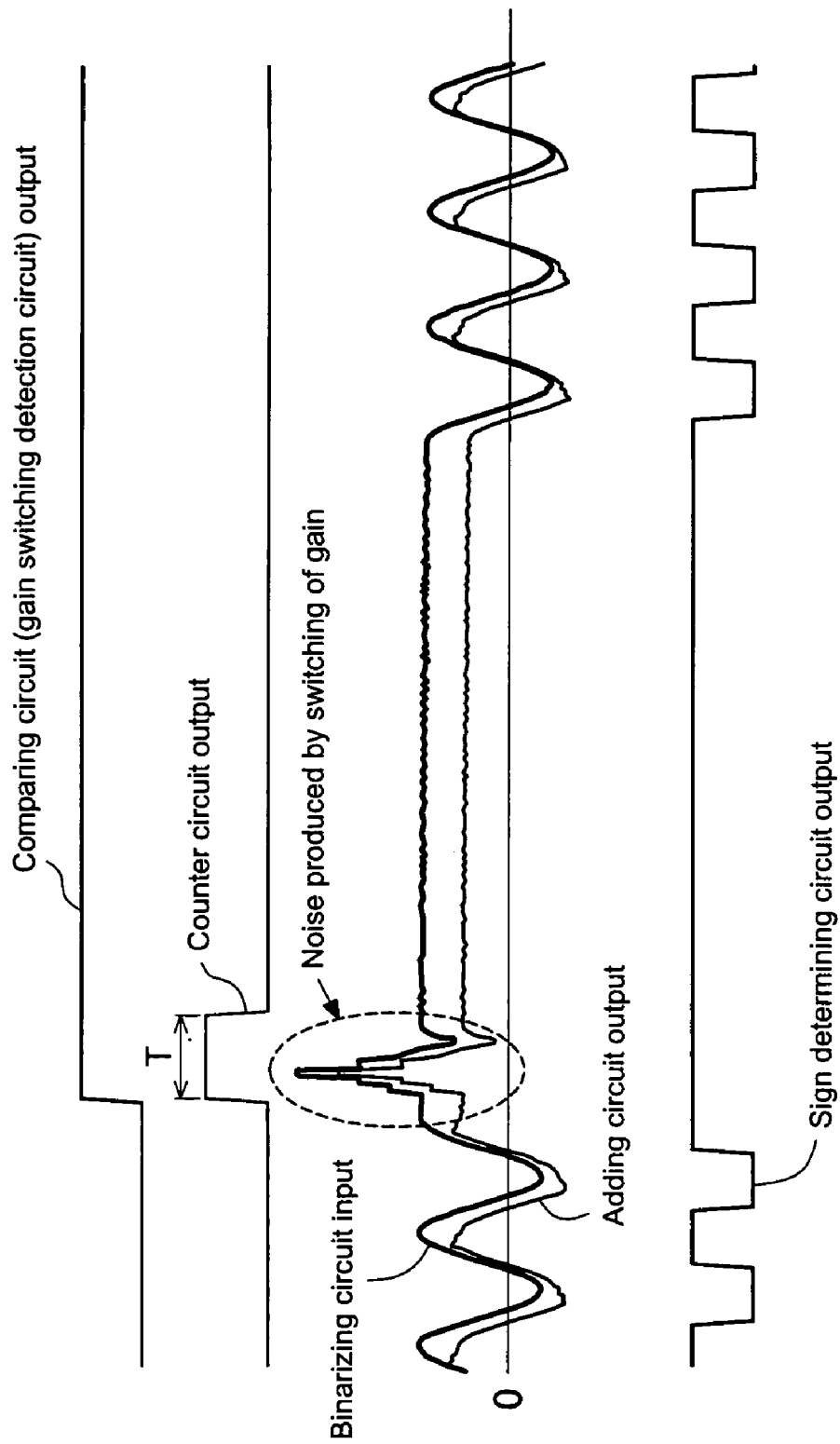
FIG. 5 is a drawing showing waveforms output by respective blocks in the block diagram of the binarizing circuit shown in FIG. 4.

Moreover, in the present embodiment, due to the fact that, as indicated in the output waveform diagram of FIG. 5, the output from counter circuit 16 is made HIGH, causing the output, from offset canceler circuit 203 (the output from adding circuit 202) to be held at substantially constant value, for prescribed time T (the period when noise produced by the variable gain amplifier might otherwise exert adverse effect on binarizing circuit 201) from point(s) in time when the output of comparing circuit 7 is inverted, i.e., from point(s) in time when the gain of variable gain amplifier 5 is switched, abnormal operation of binarizing circuit 201 is prevented and deterioration in BER is prevented.

Accordingly, the present embodiment permits attainment of prevention of deterioration in BER attributable to noise resulting from switching of gain(s) while it is at the same time provided with binarizing circuit(s) capable of accurately carrying out binarization notwithstanding any sudden change(s) in DC offset(s) which may occur.

Note, moreover, that in the foregoing respective embodiments, variable gain amplifier 5 may also serve as BPF(s). Furthermore, time(s) counted by counter circuit 16 may be made variable, and it is also possible to make such counted time(s) capable of being changed by external manipulation.

Furthermore, whereas, in the foregoing respective embodiments, comparing circuit 7 also served as gain switching detection circuit(s), it is possible to provide comparing circuit(s) and gain switching detection circuit(s) in the form of respectively separate components.

The present invention may be embodied in a wide variety of forms other than those presented herein without departing from the spirit or essential characteristics thereof. The foregoing embodiments and working examples, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are moreover within the scope of the present invention.

Furthermore, all references cited in the present specification are specifically incorporated herein by reference in their entirety.

What is claimed is:

1. A receiving apparatus comprising:
   at least one variable gain amplifier;
   at least one level detection circuit, which detects at least one level output from said at least one variable gain amplifier;
   at least one comparing circuit for comparing at least one reference level to said at least one output from said at least one level detection circuit;
   at least one demodulator;
   at least one binarizing circuit;
   at least one slice level holding circuit holding at least one substantially constant value at least one slice level employed by said at least one binarizing circuit; and
   at least one counter circuit;
   wherein at least one gain of said at least one variable gain amplifier is switched based on at least one result of comparison by said at least one comparing circuit; and
   wherein, when said at least one gain is switched, said at least one counter circuit and said at least one slice level holding circuit cause said at least one slice level to be held at said at least one substantially constant value for at least one prescribed time.

2. The receiving apparatus according to claim 1, wherein said at least one variable gain amplifier serves as at least one bandpass filter.

3. The receiving apparatus according to claim 1, wherein said at least one comparing circuit serves to detect switching of said at least one gain.

4. The receiving apparatus according to claim 1, wherein said at least one time counted by said at least one counter circuit is variable.

5. The receiving apparatus according to claim 1, wherein said at least one binarizing circuit comprises:
   at least one minimum value detection circuit and at least one maximum value detection circuit accepting input of at least one demodulated signal from said at least one demodulator by way of at least one demodulated signal holding circuit and respectively detecting at least one minimum value and at least one maximum value of said at least one demodulated signal input thereto;
   at least one adding circuit adding said at least one minimum value and said at least one maximum value;
   at least one amplifier substantially halving at least one output of said at least one adding circuit; and
   at least one comparing circuit carrying out binarization by comparing at least one magnitude of at least one output from said at least one amplifier and at least one magnitude of said at least one demodulated signal from said at least one demodulator;
   said at least one demodulated signal holding circuit functioning as said at least one slice level holding circuit.

6. The receiving apparatus according to claim 1, wherein said at least one binarizing circuit comprises:
   at least one offset canceler circuit outputting, when at least one signal input thereto is less than at least one lower cutoff value, said at least one signal corresponding to at least one amount by which said at least one signal input thereto is less than said at least one lower cutoff value, and outputting, when said at least one signal input thereto is greater than said at least one upper cutoff value, said at least one signal corresponding to said at least one amount by which said at least one of the signal input thereto is greater than said at least one upper cutoff value;
at least one integrating circuits integrating said at least one output therefrom;
at least one offset canceler output holding circuit provided between said at least one offset canceler circuit and said at least one integrating circuit;
at least one adding circuit adding and feeding back at least one output from said at least one integrating circuit to at least one input signal; and
at least one sign determining circuit using the sign of at least one signal output from said at least one adding circuit to carry out binarization;
said at least one offset canceler output holding circuit functioning as said at least one slice level holding circuit.

7. The receiving apparatus according to claim 1, wherein said at least one binarizing circuit or circuits comprises:
at least one offset canceler circuit outputting, when at least one signal input thereto is less than at least one lower cutoff value, said at least one signal corresponding to at least one amount by which said at least one signal input thereto is less than said at least one lower cutoff value, or outputting, when said at least one signal input thereto is greater than said at least one upper cutoff value, said at least one signal corresponding to said at least one amount by which said at least one signal input thereto is greater than said at least one upper cutoff value;
at least one integrating circuit integrating said at least one output therefrom;
at least one offset canceler output holding circuit provided between said at least one offset canceler circuit and said at least one integrating circuit;
at least one adding circuit adding and feeding back at least one output from said at least one integrating circuit to at least one input signal; and
at least one sign determining circuit using the sign of at least one signal output from said at least one adding circuit to carry out binarization;
said at least one offset canceler output holding circuit functioning as said at least one slice level holding circuit.

8. A receiving apparatus comprising:
a variable gain amplifier;
a level detection circuit for detecting an output of the variable gain amplifier;
a comparing circuit for comparing a reference level to said output from said level detection circuit and outputting a gain setting signal comprising a positive gain setting signal or a negative gain setting signal;
a demodulator;
a binarizing circuit;
a slice level holding circuit holding a slice level employed by said binarizing circuit at a substantially constant value; and
a counter circuit receiving a first input when said comparing circuit outputs the positive gain setting signal and a second input when said comparing circuit outputs the negative gain setting signal, the counter circuit being operatively connected to said slice level holding circuit;
said counter circuit causing said slice level holding circuit to hold the slice level at the substantially constant value for a given time when said first input changes to said second input or when said second input changes to said first input.

9. The receiving apparatus according to claim 8, wherein said binarizing circuit comprises:
a minimum value detection circuit and a maximum value detection circuit accepting input of a demodulated signal from said demodulator by way of said slice level holding circuit and respectively detecting at least one minimum value and at least one maximum value of said at least one demodulated signal input thereto;
an adding circuit adding said minimum value and said maximum value;
an amplifier substantially halving an output of said adding circuit; and
a comparing circuit carrying out binarization by comparing a magnitude of an output from said amplifier and a magnitude of said demodulated signal from said demodulator.

10. The receiving apparatus according to claim 8, wherein said binarizing circuit comprises:
an offset canceler circuit outputting, when an input signal input thereto is less than a lower cutoff value, an output signal corresponding to an amount by which said input signal is less than said lower cutoff value, and outputting, when said input signal is greater than an upper cutoff value, an output signal corresponding to an amount by which said input signal is greater than said upper cutoff value;
an integrating circuit integrating said output signal;
an adding circuit adding and feeding back an output from said integrating circuit to said input signal; and
a sign determining circuit using the sign of a signal output from said adding circuit to carry out binarization;
wherein said slice level holding circuit is provided between said offset canceler circuit and said integrating circuit.

11. A receiving apparatus comprising:
a variable gain amplifier;
a level detection circuit for detecting an output of the variable gain amplifier;
a comparing circuit for comparing a reference level to said output from said level detection circuit and outputting a gain setting signal comprising a positive gain setting signal or a negative gain setting signal;
a demodulator;
a binarizing circuit;
means for holding a slice level employed by said binarizing circuit at a substantially constant value; and
a counter circuit receiving a first input when said comparing circuit outputs the positive gain setting signal and a second input when said comparing circuit outputs the negative gain setting signal, the counter circuit being operatively connected to said means for holding a slice level employed by said binarizing circuit at a substantially constant value;
said counter circuit causing said means for holding a slice level employed by said binarizing circuit at a substantially constant value to hold the slice level at the substantially constant value for a given time when said first input changes to said second input or when said second input changes to said first input.

12. The receiving apparatus according to claim 11, wherein said binarizing circuit comprises:
a minimum value detection circuit and a maximum value detection circuit accepting input of a demodulated signal from said demodulator by way of said means for holding a slice level employed by said binarizing circuit at a substantially constant value and respectively detecting at least one minimum value and at least one maximum value of said at least one demodulated signal input thereto;

an adding circuit adding said minimum value and said maximum value;

an amplifier substantially halving an output of said adding circuit; and a comparing circuit carrying out binarization by comparing a magnitude of an output from said amplifier and a magnitude of said demodulated signal from said demodulator.

13. The receiving apparatus according to claim 11, wherein said binarizing circuit comprises:

an offset canceler circuit outputting, when an input signal input thereto is less than a lower cutoff value, an output signal corresponding to an amount by which said input signal is less than said lower cutoff value, and outputting, when said input signal is greater than an upper cutoff value, an output signal corresponding to an amount by which said input signal is greater than said upper cutoff value;

an integrating circuit integrating said output signal;

an adding circuit adding and feeding back an output from said integrating circuit to said input signal; and a sign determining circuit using the sign of a signal output from said adding circuit to carry out binarization;

wherein said means for holding a slice level employed by said binarizing circuit at a substantially constant value being provided between said offset canceler circuit and said integrating circuit.

* * * * *